Patented Apr. 18, 1950

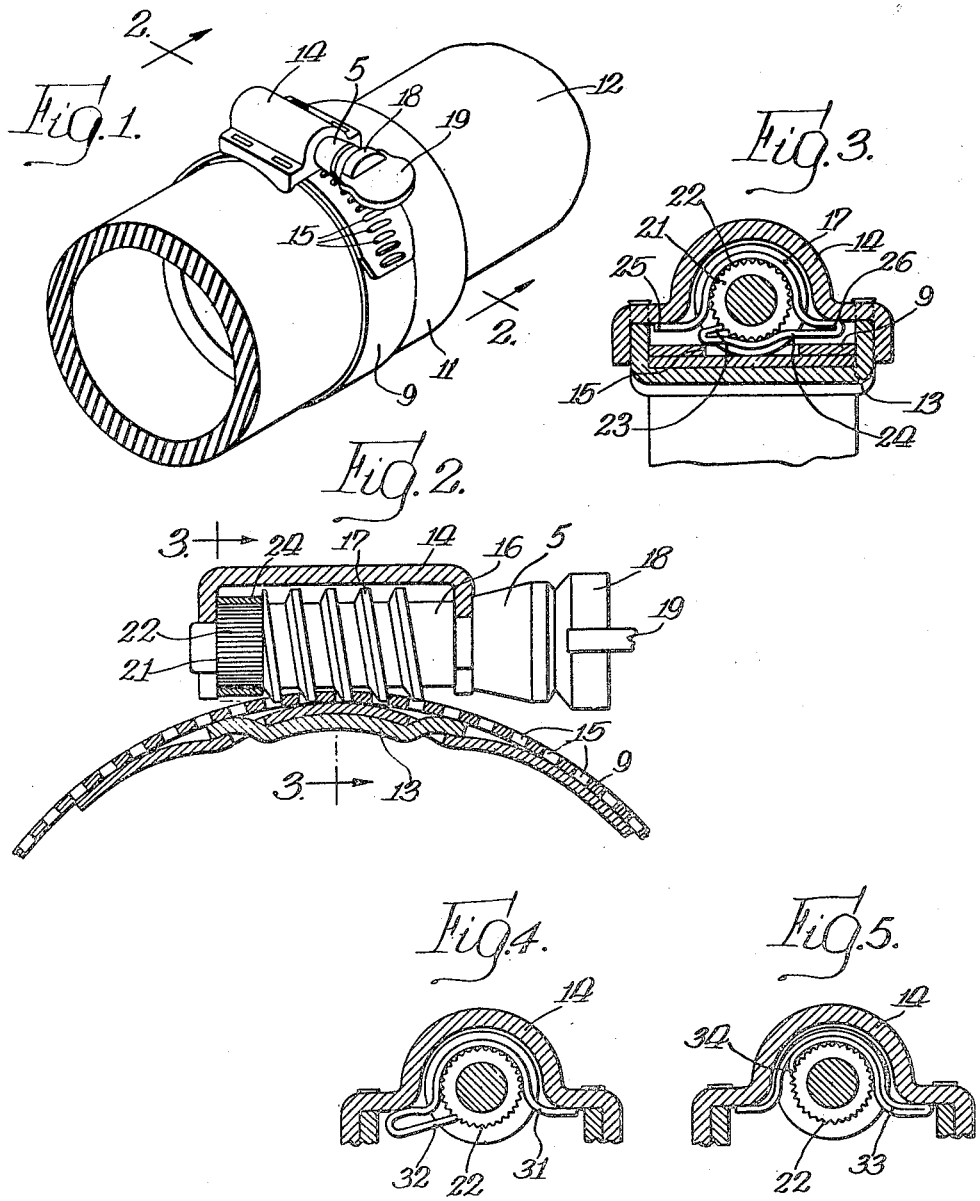

2,504,836

UNITED STATES PATENT OFFICE 2,504,836

HOSE CLAMP

Keith A. Hill, Rockford, Ill., assignor, by mesne assignments, to Breeze Corporations, Inc., Newark, N. J., a corporation of New Jersey Application June 8, 1945, Serial No. 598,254

5 Claims. (Cl. 24—19)

This invention relates to hose clamps for securing rubber hose or the like to tubular pipes or fittings. While the invention may be embodied in clamps of various sizes and for various kinds of hose, it is particularly suitable for making the hose connections in aeroplane construction wherein such connections are necessary for the air, fuel and hydraulic lines.

One type of clamp which has given very satisfactory service in aeroplane construction comprises a metal clamping band having a tightening screw mounted in a housing on one end of the band, the free end of the band being provided with openings adapted to receive the threads of the screw whereby rotation of the screw will tighten the clamp.

My present invention is designed to prevent reverse rotation of such tightening screw and consequent loosening of the clamp as the result of vibration or other causes induced by the operation of the motor or by other factors tending to loosen such screws.

With this end in view my invention contemplates the provision of a frictional holding device which will hold the tightening screw against reverse rotation under the influence of vibration or other loosening effects, but the holding action of which can be overcome by the application of sufficient force, such as manually turning or with the aid of a wrench.

As exemplifications of the principles of my invention I have illustrated on the accompanying drawing those embodiments thereof which at present seem preferable, and from a consideration of said drawing in connection with the following description the invention in its preferred forms should be readily understood and appreciated.

Referring to the drawing,

Fig. 1 is a perspective view of a hose clamp embodying the principles of my invention;

Fig. 2 is a fragmental sectional view on the line 2—2 of Fig. 1;

Fig. 3 is a sectional view on the line 3—3 of Fig. 2; and

Figs. 4, and 5, are views similar to Fig. 3 respectively illustrating modifications of the device for holding the screw against reverse rotation.

Referring to the drawing more in detail, reference character 9 indicates generally the clamping band or tape of a clamp adapted to embrace and securely clamp a hose 11 to a pipe or fitting 12.

One end of the clamping band is constructed for interlocking engagement with the saddle 13 forming the base for the housing 14 whereby said housing is securely mounted on the band. The free end of the band is provided for some distance with spaced apart transversely disposed openings 15, and the housing is constructed to permit the extension of the free end of the band therethrough. This permits the ends of the band to be overlapped and tensioned for tightening the clamp.

A tightening screw 5 comprising a cylindrical body 16 provided with peripheral threads 17 is rotatably mounted in the housing 14 and is provided with a head 18 equipped with a finger piece 19 by which the screw may be turned to tighten or loosen the clamp. The screw is designed and positioned in the housing so that the threads 17 engage in the openings 15 of the overlapping end of the band, as illustrated in Fig. 2, and the band is held by these threads in tightened condition under tension so long as reverse or loosening movement of the screw does not occur.

To prevent accidental reverse movement or loosening of the screw, I have in the embodiment disclosed in Figs. 2 and 3 provided the drum 21, formed by the extension of the screw body beyond the threads, with peripheral serrations or knurling 22, thus forming a ratchet wheel adapted to be engaged by a claw 23 consisting of the reversely bent end of a spring 24 overlying the knurled portion of the screw with its lateral extremities 25 and 26 arranged to engage beneath the flanges of the housing to thereby hold the spring against rotation with the screw.

When the screw is tightened, that is, rotated in a counterclockwise direction viewing Fig. 3, the claw 23 will ride over the serrations as they pass in succession and will not offer any appreciable resistance to the tightening movement of the screw. The engagement of the claw, however, with an opposed serration will offer substantial resistance to reverse movement of the screw and will hold the same against accidental loosening movement under the influence of vibrations or other rotative influences. The screw may be reversely rotated to loosen the clamp by the application of sufficient force to the finger piece 19 or by manipulation of a tool designed to engage with the screw. The force required to thus reversely rotate the screw is greater than any that would arise from vibration or other operating effects of a motor or the like to which a hose is connected. The holding device, therefore, serves as a lock to prevent reverse rotation of the tightening screw except when the same is manually manipulated by the application of considerable force.

In Fig. 4 the spring 31 overlies the serrated surface 22 of the drum and has one end reversely bent to provide the claw 32 which engages the serrations on the drum. It will be manifest that tightening movement of the screw, i. e., in a counterclockwise direction, is not resisted to any substantial degree, but reverse movement is resisted by the claw until it assumes a position where the serrations can be forced past the end of the claw to enable the screw to be loosened.

Still another form of spring holding device is disclosed in Fig. 5, from which it will be observed that the spring 33 is reversely bent upon itself and one end is inturned to provide the claw 34 for engagement with the knurled surface 22 of the drum. Like the disclosures of Figs. 3 and 6, this claw 34 will offer but slight resistance to tightening movement of the screw, but will resist loosening movement until the force applied to the screw becomes sufficiently great to force the serrations past the end of the claw.

It will be apparent from the foregoing that I have provided a hose clamp in which the tightening screw will be automatically locked to hold the clamp in tightened position. While such lock is a frictional one, it is sufficient to resist any tendencies of the screw to work loose under the influence of vibration or other loosening tendencies. The lock does not, however, preclude loosening of the clamp when a substantial force, such as can be manually applied to the screw, is exerted.

The structural details illustrated and described may obviously be varied within considerable limits without departing from the scope of my invention as defined in the following claims.

I claim:

1. A hose clamp, comprising a metal clamping band provided near one end with a series of spaced apart openings, rotatable clamp tightening means mounted on the other end of said band and adapted to engage in said openings, a knurled drum rotatable with said tightening means, and means including a claw engageable with said drum to oppose reverse rotation thereof.

2. A hose clamp, comprising a metal band provided with a series of spaced apart openings, a housing attached to one end of said band, a clamp tightening screw rotatable in said housing, a peripherally serrated drum fixedly carried by the screw and a spring mounted in the housing and provided with a claw engageable with the serrations of said drum to oppose reverse rotation of said screw.

3. A hose clamp comprising a metal clamping band provided with a series of spaced apart openings, a housing attached to one end of the band, a clamp tightening screw rotatable in the housing, a peripherally serrated drum attached to a body portion of the screw, and a spring mounted in the housing to overlie the serrated drum, and provided with a claw engageable with the serrations of the drum to oppose reverse movement of the screw.

4. A hose clamp comprising a flat band to surround a hose, one end of the band being provided with a plurality of transverse slots, a housing on the opposite end of the band to receive the slotted end of the band, a clamp tightening screw carried by the housing to engage the slots and constrict the clamp about a hose, a serrated drum on the forward end of the screw and a spring carried by the housing to engage the serrations to prevent casual reverse rotation of the screw.

5. In a hose clamp consisting of a tape having teeth disposed at one end of the tape, a housing affixed to the opposite end of the said tape, and a worm gear rotatably carried by the said housing to engage the said teeth whereby the length of said tape may be adjusted; a ratchet wheel rigidly affixed to the said worm gear, a resilient member affixed to the said housing and a pawl carried by the said resilient member coacting with the said ratchet wheel so as to permit movement of the worm in the direction which tightens the tape and to restrict movement in the direction which loosens the said tape.

KEITH A. HILL.

REFERENCES CITED

The following references are of record in the file of this patent:

UNITED STATES PATENTS

| Number | Name | Date |
|---|---|---|
| 640,080 | Barber | Dec. 26, 1899 |
| 1,874,731 | Younce | Aug. 30, 1932 |
| 2,356,041 | Fay | Aug. 15, 1944 |
| 2,386,629 | North et al. | Oct. 9, 1945 |